United States Patent
Weger

(10) Patent No.: US 8,129,922 B2
(45) Date of Patent: Mar. 6, 2012

(54) METHOD FOR CONTROLLING A HIGH-FREQUENCY TRANSFORMER

(75) Inventor: Robert Weger, Wels (AT)

(73) Assignee: Mineba Co., Ltd., Nagano-Ken (JP)

( * ) Notice: Subject to any disclaimer, the term of this patent is extended or adjusted under 35 U.S.C. 154(b) by 423 days.

(21) Appl. No.: 12/488,808

(22) Filed: Jun. 22, 2009

(65) Prior Publication Data

US 2009/0322249 A1 Dec. 31, 2009

(30) Foreign Application Priority Data

Jun. 26, 2008 (DE) .......................... 10 2008 029 961

(51) Int. Cl.
G05F 1/00 (2006.01)
H05B 37/02 (2006.01)
H05B 39/04 (2006.01)
H05B 41/36 (2006.01)

(52) U.S. Cl. ................... 315/291; 315/209 R; 315/219; 315/221; 315/307

(58) Field of Classification Search .................. None
See application file for complete search history.

(56) References Cited

U.S. PATENT DOCUMENTS 7,881,084 B2 * 2/2011 Lin .................................. 363/98
2007/0171684 A1 * 7/2007 Fukumoto .................. 363/21.09

* cited by examiner

*Primary Examiner* — Anh Tran
(74) *Attorney, Agent, or Firm* — Volpe and Koenig, P.C.

(57) ABSTRACT

A method for controlling a high-frequency transformer by which the acoustic transformer noises occurring during intermittent operation (burst operation) are reduced. This is achieved according to the invention by halving a length of the first and the last pulse of an AC voltage pulse train or the first and the last half-wave in the ON interval (Tn). This goes to avoid magnetizing peaks in the core that cause a major part of the background noise.

8 Claims, 1 Drawing Sheet

METHOD FOR CONTROLLING A HIGH-FREQUENCY TRANSFORMER

BACKGROUND

The invention relates to a method for controlling a high-frequency transformer having at least one primary and one secondary winding on a transformer core used for intermittent operation in which the transformer is alternately connected (Tn) at regular intervals to a high-frequency voltage having a constant frequency (ON interval) and again disconnected (OFF interval) (Tf) from it.

Liquid crystal (LC) screens and televisions are now in widespread use. Since liquid crystal displays do not themselves emit light, they have to be illuminated from behind by an ancillary source of light. These kinds of backlights are generally made up of a plurality of fluorescent tubes, particularly cold cathode tubes, arranged in parallel behind the LC display.

Cold cathode tubes are operated at a high-frequency AC voltage ranging between 30 kHz and 65 kHz. They are controlled, for example, using a high-frequency transformer that is supplied by a bridge circuit.

In order to regulate the brightness of the tubes and thus the brightness of the image, the arrangement is operated in an intermittent mode (burst operation). Here, a bridge circuit generates the high-frequency operating voltage as well as the pauses for the burst operation. The brightness of the tube is the result of the mean power that is transferred during an ON-OFF period.

A pulse diagram for the voltage flow V and the current flow I at the primary winding of a high-frequency transformer is illustrated in FIG. 1. A burst period comprises exactly one ON interval Tn and one OFF interval Tf. The length of the burst period thus results from the sum of Tf+Tn and is constant, i.e. the interval frequency (burst frequency) is constant. During the period Tn, the AC voltage V is applied to the primary winding of the transformer. The AC voltage V is a square wave voltage having a constant frequency, which starts, for example, with a positive half-wave 1. The magnetizing current I in the transformer does not immediately follow the voltage V but rather increases slowly until the end of the voltage half-wave. Here, the magnetizing current I increases to up to twice the normal level 7. This excessive current 8 decays with time due to ohmic losses in the transformer and the switching elements, so that several wave trains later, the current peaks are at equilibrium level 7. After the last pulse of the ON interval Tn, the current I decays to zero, where, depending on the main inductance of the transformer and the impedance at the transformer, the decay time may extend far into the subsequent OFF interval Tf.

Operation with short ON intervals Tn becomes problematic since the current I does not have enough time to reach the normal level 7. A short OFF interval also causes problems since here again the current cannot decay fully. If the current has not decayed fully before the next ON interval begins, the excessive current 8 may increase even further in successive burst periods.

Depending on the design of the transformer, this may force the transformer core into saturation, which may result in exceptionally high current peaks.

Due to magnetostriction and through magnetic forces in the transformer core, mechanical changes in the length of the core or mechanical vibrations of the core may occur. This produces broadband acoustic noises with a predominate portion in the frequency range of the burst frequency. Specifically for use in backlights for LCD screens or televisions, such noises can be highly disruptive. These two effects depend greatly on the intensity of the magnetic field or on the intensity of the magnetizing current.

In the prior art, several solutions have already been proposed for reducing these noises. One method, for example, implements a so-called "soft start", in which the pulse length of the high-frequency voltage is slowly raised. A disadvantage of this method is the relatively long start-time until the full pulse width is achieved. Thus, particularly in the case of short ON intervals, the full pulse width may not be achieved.

SUMMARY

The object of the invention is therefore to provide a method for controlling a high-frequency transformer in which the operating noises are substantially reduced and which does not place any restrictions on the pulse width.

This object has been achieved according to the invention in that in every ON interval the length of the first and the last pulse of the high-frequency voltage is halved.

As mentioned above, the current in the transformer increases until the end of the first voltage half-wave or of the first pulse and reaches twice the normal level. If the first pulse or the first voltage half-wave is now only half as long, the current can only increase to the normal level. This means that an excess of current does not occur, thus also eliminating the risk of core saturation. Since no excessive current peaks occur, the noises that arise due to current-related effects are considerably less pronounced than in applications according to the present prior art.

Halving the pulse length of the last half-wave of an ON interval additionally ensures that the current returns to zero immediately at the end of the ON interval and does not decay slowly in the OFF interval. This also brings about a more distinct separation between the ON interval and the OFF interval. It also ensures that even in the case of very short OFF intervals, no excessive current occurs at the start of the subsequent ON interval.

BRIEF DESCRIPTION OF THE DRAWINGS

The invention is described in more detail below on the basis of the drawings.

The drawings show.

DETAILED DESCRIPTION OF THE PREFERRED EMBODIMENTS

Figure 1:
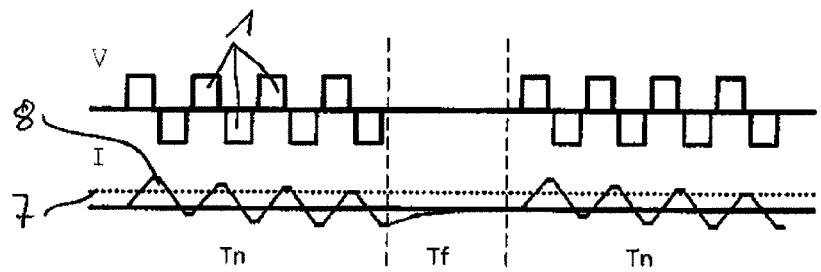
FIG. 1 a typical pulse pattern such as occurs during control of a high-frequency transformer according to the prior art, FIG. 2 a typical pulse pattern of the method according to the invention having a different pulse polarity for the start and end pulse, FIG. 3 a further typical pulse pattern according to the invention having the same pulse polarity for the start and end pulse, and FIG. 4 a block diagram for controlling a fluorescent tube using the method according to the invention.
Figure 2:
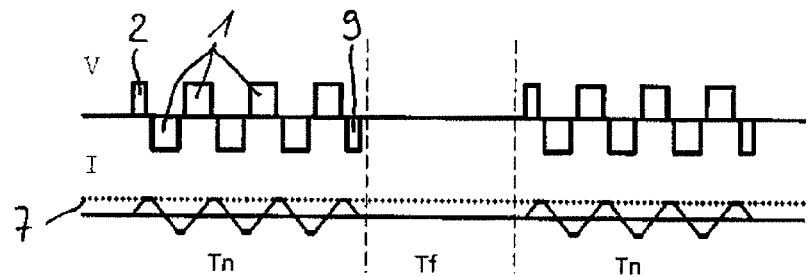

A pulse pattern is illustrated in FIG. 2 such as occurs during control of a high-frequency transformer according to the invention. The voltage flow V in the ON interval Tn starts with a positive half-wave 2 lasting for half the normal length, followed directly by a negative half-wave 1 of full length. Positive and negative half-waves 1 then follow alternately. The last half-wave 9 in the ON interval Tn, like the first half-wave, is only half length, but now negative. It can be seen from the current flow of the magnetizing current I that the magnetizing current I does not rise above the normal level 7. In the OFF interval Tf, voltage V and current I are immediately zero, without any post-pulse oscillation.

Figure 3:
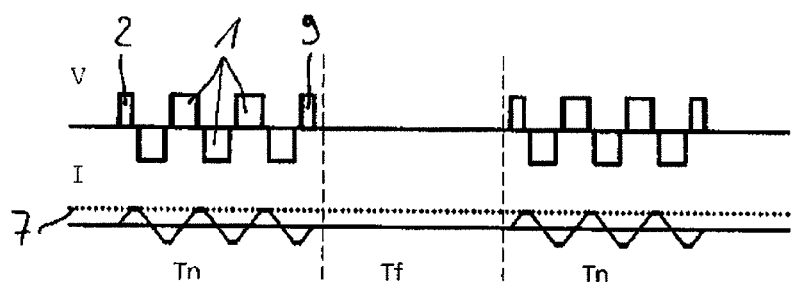

FIG. 3 shows a similar pulse pattern as in FIG. 2, although here the last pulse of the pulse train has the same polarity as the first.

Figure 4:
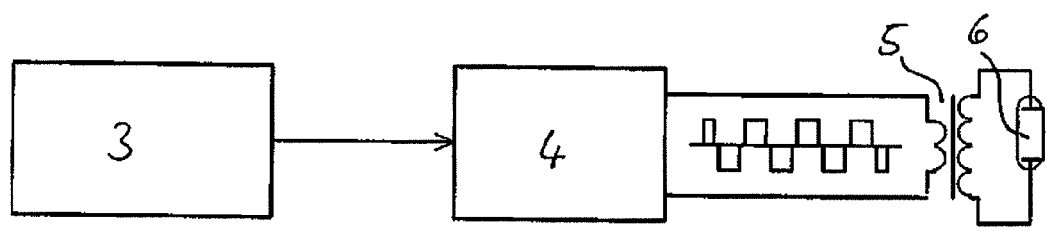

The method according to the invention for controlling high-frequency transformers is not restricted to a specific application. Application in a screen backlight is shown schematically in FIG. 4. A cold cathode tube 6 is connected to the secondary winding of a high-frequency transformer 5. The primary winding of the transformer 5 is connected to a bridge circuit 4, wherein a half or full-bridge circuit may be used. The bridge circuit 4 is controlled by a bridge controller 3. In the bridge controller, a microcontroller or microprocessor may be programmed such that the bridge circuit emits a pulse pattern according to the invention in accordance with FIG. 2 or 3. No further components are needed for this purpose. The invention can be implemented simply by adapting the control program of the bridge controller 3. It is thus also possible to implement the method according to the invention retrospectively in existing appliances by updating the control program.

IDENTIFICATION REFERENCE LIST

1 Half-wave
2 Half-wave of half length
3 Bridge controller
4 Bridge circuit
5 High-frequency transformer
6 Cold cathode tube
7 Normal current level
8 Excessive current
9 Half-wave of half length Tn ON interval
Tf OFF interval

The invention claimed is:

1. A method for controlling a high-frequency transformer (5) having at least one primary and one secondary winding on a transformer core used for intermittent operation, comprising:
supplying the transformer at regular intervals with a high-frequency voltage (V) (ON interval) (Tn) and separating the ON intervals by OFF intervals (Tf) in which no voltage is applied to the primary winding, and
in each ON interval (Tn) halving a length of the first (2) and last (9) half-wave of the high-frequency voltage or a length of the first and last pulse of a high-frequency pulse train (V).

2. The method according to claim 1, wherein the high-frequency voltage (V) is generated by a bridge circuit (4) that is controlled by a bridge controller (3).

3. The method according to claim 2, wherein the halving of the first (2) and last half-wave (9) is achieved by programming the bridge controller (3).

4. The method according to claim 2, wherein the bridge circuit (4) is a full-bridge circuit.

5. The method according to claim 2, wherein the bridge circuit (4) is a half-bridge circuit.

6. The method according to claim 1, wherein a frequency of the high-frequency voltage (V) lies between 30 kHz and 65 kHz.

7. The method according to claim 1, further comprising controlling fluorescent tubes using the high-frequency transformer (5).

8. The method according to claim 1, further comprising controlling backlights for flat screens using the high-frequency transformer (5).

* * * * *

UNITED STATES PATENT AND TRADEMARK OFFICE
CERTIFICATE OF CORRECTION

PATENT NO.        : 8,129,922 B2
APPLICATION NO.   : 12/488808
DATED             : March 6, 2012
INVENTOR(S)       : Robert Weger Page 1 of 1

It is certified that error appears in the above-identified patent and that said Letters Patent is hereby corrected as shown below:

Title Page item (73) Assignee, please delete "Mineba Co., Ltd." and insert therefore
-- Minebea Co. Ltd. --.

Signed and Sealed this
Eighth Day of May, 2012

David J. Kappos
*Director of the United States Patent and Trademark Office*